Patented Aug. 27, 1940

2,212,811

UNITED STATES PATENT OFFICE 2,212,811

STABILIZED GYPSUM PLASTER

George L. Hann, Philadelphia, Pa., assignor to United States Gypsum Company, Chicago, Ill., a corporation of Illinois No Drawing. Application December 29, 1937, Serial No. 182,255

12 Claims. (Cl. 106—34)

The present invention relates to an improvement in gypsum plaster.

One of the objects of the invention is to produce a gypsum plaster the setting time of which is stabilized against the adventitious admixture therewith of accelerating and retarding influences and materials, such for example as added sand or other aggregates, soluble salts in the gaging water, unclean mixing tools and mortar boxes, etc.

A further object of the invention is to prepare a calcium sulfate hemihydrate cement or plaster to which there has been added a certain amount of Portland cement, either with or without lime, and commercial retarder, the proportions being such that there results a cementitious product the setting time of which is but little influenced by the amount of the adventitious accelerating material which may become admixed therewith, the amount and type of aggregate used therein, or retarding influences of materials which may become admixed therewith in use.

It has been found that ordinary calcined gypsum plaster or stucco will have a different setting time when used alone or neat than it will when mixed with various amounts of aggregate, particularly sharp-edged aggregate such as building sand. Usually such sand greatly accelerates the set and may cause it to be so rapid as to present difficulties in plastering with a given mix before it has permaturely set up in the mixing boxes. Furthermore, the time of set of calcined gypsum plasters often differs very greatly with an increase in the normal amount of sand used therewith. All of this is, of course, very disadvantageous and requires correction.

A number of means have been discussed in the prior art for accomplishing this desirable result. Thus it has been proposed to mix with the gypsum various accelerating agents, such as calcium sulfate dihydrate crystals or materials which are capable, upon wetting, of forming such crystals, there being also used a considerably increased amount of commercial chemical retarder, which latter has a tendency to increase the length of time of the set of the material. By so planning the accelerating influences of the added gypsum crystals, either natural or produced by metathesis, against the retarding influences of the retarder, it has been found that a fairly well set-stabilized plaster can be produced.

In accordance with the present invention, however, it has been found that a considerable set-stabilizing effect can be secured by the employment, in conjunction with the calcined gypsum, of comparatively large amounts of Portland cement, used either alone or conjointly with a certain amount of lime, there being also employed a considerable quantity of retarder—at least a larger amount than would normally be used with the plaster if the cement and lime were omitted.

By adding this Portland cement, it has been found that the plaster can be prepared so that the setting time will vary very little whether one part of sand be used therewith or as much as four parts of sand.

Tests have been conducted in which the plaster prepared in accordance with the present invention was tested both under normal working conditions by a test which is known in this art as a "board" test and on a clean glass slab, using entirely clean utensils, this test being known as a "clean" test. As a result of these investigations, it was found that by using about 50 to 100 pounds of Portland cement for every ton of calcined gypsum plaster, very desirable set-stabilizing properties could be developed in the plaster. Still more advantageous results were obtained by using, in addition thereto, ordinary slaked lime or calcium hydroxide in an amount equal to about one-half of the weight of the cement.

As exemplification of the successful carrying out of the present invention, the following examples are given:

*Example 1*

| | Pounds |
|---|---|
| Calcined gypsum | 1850 |
| Portland cement | 100 |
| Lime (in the form of calcium hydroxide or hydrated lime) | 50 |
| Commercial retarder | 10 |

This mixture proved to be very satisfactory. When mixed with one part of sand it had a board set of 2 hrs., 40 min., and a clean test set of 12 hrs., 15 min.; with 2½ parts of sand, 2 hrs., 20 min., and 11 hrs., 5 min.; and with 4 parts of sand, 2 hrs., 50 min., and 10 hrs., 15 min. This shows a high degree of set-stabilization. For purposes of comparison, the same calcined gypsum was mixed with 7 lbs. of retarder per ton, omitting the Portland cement and the lime. This mixture, when mixed with sand in the proportions indicated above, set on a board in from 2 hrs., 20 min., to 3 hrs., 15 min.; but when used clean, set in anywhere from 9 hrs. to as much as 37 hrs., 40 min.; thus showing no stabilizing effect.

*Example 2*

| | Pounds |
|---|---|
| Calcined gypsum | 1900 |
| Portland cement | 100 |
| Retarder | 7 |

In this formula no lime was used. The set with one part of sand was 4 hrs., 10 min., on the board; and 10 hrs., 45 min., clean. With 2½ parts of sand the set was 3 hrs., 5 min., and 9 hrs., respectively; with 4 parts of sand, 3 hrs. and 8 hrs., 15 min., respectively. Without sand the set was 6 hrs., 30 min., board, and 15 hrs. clean.

Of the above two examples, the first is preferable, although a little more expensive. The lime-Portland cement mixture also has better working properties.

So far as the process of producing these plasters is concerned, this presents no difficulties, as a mere physical admixture of materials to secure a thorough blending of the constituents is all that is required to carry the invention into effect.

In the above examples, the material designated as "commercial retarder" is a well known article of commerce, usually made from keratinous material which has been treated with an alkali, such as caustic soda and lime. Some of the commercial retarders are made with various forms of gelatin, glue, and lime. The main principle underlying these materials is that they produce in the plaster, when it is mixed with water, a solution of a protein or a proteid which prevents the too rapid formation of the gypsum crystals which cause the setting. In other words, the commercial retarder merely delays the time of set so that the material can be applied where desired before it hardens.

Other known protein retarders, as well as certain inorganic salts and organic materials not of a proteid nature may also be used.

Further modifications will be apparent to those skilled in the art, and it is desired, therefore, that the invention be limited only by the prior art and the scope of the appended claims.

Having thus described my invention, what I claim and desire to secure by Letters Patent is:

1. A gypsum plaster stabilized as to its setting time against adventitious accelerating and retarding influences being substantially free of water soluble sulfates other than the sulfates of calcium which comprises calcium sulfate hemihydrate and set accelerating quantities of Portland cement not exceeding about 100 pounds per ton of stabilized plaster.

2. A gypsum plaster stabilized as to its setting time against adventitious accelerating and retarding influences being substantially free of water soluble sulfates other than the sulfates of calcium which comprises calcium sulfate hemihydrate, retarder, and set accelerating quantities of Portland cement not exceeding about 100 pounds per ton of stabilized plaster.

3. A gypsum plaster stabilized as to its setting time against adventitious accelerating and retarding influences being substantially free of water soluble sulfates other than the sulfates of calcium which comprises calcium sulfate hemihydrate, retarder, and from 50 to 100 pounds of Portland cement per ton of stabilized plaster.

4. A gypsum plaster stabilized as to its setting time against adventitious accelerating and retarding influences being substantially free of water soluble sulfates other than the sulfates of calcium which comprises calcium sulfate hemihydrate, lime, retarder, and set accelerating quantities of Portland cement not substantially exceeding 100 pounds per ton of stabilized plaster.

5. A gypsum plaster stabilized against adventitious accelerating and retarding influences which consists substantially of about 1850 parts by weight of calcined gypsum, 100 parts of Portland cement, 50 parts of hydrated lime, and 10 parts of commercial retarder.

6. A gypsum plaster stabilized against adventitious accelerating and retarding influences being substantially free of water soluble sulfates other than the sulfates of calcium which comprises calcium sulfate hemihydrate, retarder, and a mixture of set accelerating quantities of Portland cement and lime, said mixture being present in an amount not substantially exceeding about 150 pounds per ton of stabilized plaster.

7. The method of stabilizing calcined gypsum plaster against adventitious accelerating and retarding influences which comprises mixing 2,000 parts by weight of calcium sulfate hemihydrate and 50 to 100 parts of Portland cement to form a stabilized plaster substantially free of water soluble sulfates other than the sulfates of calcium.

8. The method of stabilizing calcined gypsum plaster against adventitious accelerating and retarding influences which comprises mixing 2,000 parts by weight of calcium sulfate hemihydrate and 50 to 100 parts of Portland cement and up to about 50 parts of calcium hydroxide to form a stabilized plaster substantially free of water soluble sulfates other than the sulfates of calcium.

9. The method of stabilizing and regulating the setting time of calcium sulfate hemihydrate plaster which comprises the addition thereto of set accelerating quantities of Portland cement and a retarder in the absence of water soluble sulfates other than the sulfates of calcium.

10. A gypsum plaster stabilized as to its setting time against adventitious accelerating and retarding influences which consists of calcium sulfate hemihydrate, retarder, and set-accelerating quantities of Portland cement not exceeding about 100 pounds per ton of stabilized plaster.

11. A gypsum plaster stabilized as to its setting time against adventitious accelerating and retarding influences which consists of calcium sulfate hemihydrate, lime, retarder, and set accelerating quantities of Portland cement not exceeding about 100 pounds per ton of stabilized plaster.

12. A gypsum plaster stabilized against adventitious accelerating and retarding influences which consists of calcium sulfate hemihydrate, retarder, and a mixture of set accelerating quantities of Portland cement and lime, said mixture being present in an amount not substantially exceeding about 150 pounds per ton of stabilized plaster.

GEORGE L. HANN.